United States Patent [19]

Marsac et al.

[11] Patent Number: 4,473,934
[45] Date of Patent: Oct. 2, 1984

[54] METHOD FOR EXTRACTING PACKING RINGS FROM A STUFFING-BOX USING A LIQUID JET

[75] Inventors: Jean-Yves Marsac, Lyons; Lucien Balzano, Jouars Pontchartrain; Marc Lepretre, Bois Colombes, all of France

[73] Assignees: Sereg, S.A., Montrouge; Bertin & Cie, S.A., Plaisir, both of France

[21] Appl. No.: 322,326

[22] Filed: Nov. 18, 1981

[30] Foreign Application Priority Data

Nov. 19, 1980 [FR] France .................. 80 24503

[51] Int. Cl.³ .............................................. B23B 35/00
[52] U.S. Cl. ...................................... 29/426.4; 83/98; 83/177
[58] Field of Search ............... 29/426.4, 426.5, 426.6, 29/157.1 R; 83/98, 177; 81/8.1

[56] References Cited

U.S. PATENT DOCUMENTS

| | | | |
|---|---|---|---|
| 3,694,894 | 10/1972 | Jelinek et al. | 29/451 |
| 3,861,248 | 1/1975 | Bushinsky | 81/8.1 |
| 3,876,213 | 4/1975 | Miliczky et al. | 277/2 |
| 3,969,813 | 7/1976 | Minetti et al. | 29/426.5 |
| 4,026,001 | 5/1977 | Jones | 29/426.5 |

*Primary Examiner*—Mark Rosenbaum
*Assistant Examiner*—Timothy V. Eley
*Attorney, Agent, or Firm*—Dale Gaudier

[57] ABSTRACT

The invention relates to a method and an apparatus for extracting packing rings from a stuffing-box, for example in a pump, a compressor or a valve.

An object of the invention is to allow easy and quick extraction of the rings even when the access to the rings is not convenient.

After opening the stuffing-box, a nozzle 39 of reduced dimension, carried by an arm 38 linked to a high pressure water supply, the pressure being of the order of 800 bars, is located above the first ring 32, approximately at the middle of its width; the arm is maintained by a fastening means 42 to the yoke of the valve. The water jet bores a hole in at least the first ring, which eliminates its internal mechanical stress and the water flowing through the hole is pushed back by the next ring, and lifts the first ring out of its housing.

8 Claims, 4 Drawing Figures

METHOD FOR EXTRACTING PACKING RINGS FROM A STUFFING-BOX USING A LIQUID JET

BACKGROUND OF THE INVENTION

1. Field of the Invention

This invention relates to a method and an apparatus for extracting packing rings from a stuffing-box, for example in a pump, a compressor or a valve.

2. Description of the Prior Art

A stuffing-box, commonly used to ensure fluid-tightness around the movable stem of a device such as a pump, a compressor or a valve, typically comprises several annular slotted packing rings fitted around the movable stem and contained in a box integral with the device, the packing rings being maintained under compression in the box by a follower or gland mounted on a flange which is bolted down towards a plate solid with the box.

After a working period which can be relatively short when the device is used with high pressure or high temperature fluids, it is necessary to replace the packing rings in order to maintain a satisfactory fluid-tightness. To achieve this, one unbolts the flange from the plate and raises the latter along the stem so as to be able to extract the follower from the box and gain access to the packing rings.

Up to now, these packing rings were successively hand extracted with the help of hooks or "corkscrew" type tools such as the extractor described in U.S. Pat. No. 3,861,248, which were driven in the upper packing and then raised in order to pull the latter out of the box.

Yet, the packing rings squeezed in the box by the follower during the working of the device have a very hard surface and are often jammed in the box. Under these conditions it is difficult for the hook to engage a packing ring and sometimes requires the use of large mechanical forces which might damage the stuffing-box or stem of the device; furthermore in some instances the follower cannot be sufficiently moved away from the box without completely dismantling the device, which renders the access to the packing rings difficult and sometimes even almost impossible.

In the worst cases the extraction operation may last several hours, which is always a significant drawback and becomes unacceptable when the operator must work in a polluted environment, as for example in nuclear power stations.

BRIEF DESCRIPTION OF THE INVENTION

It is thus an object of the invention to provide a method and an apparatus for extracting packing rings from a stuffing-box, which, contrary to the known methods or tools, allow for a quick and easy extraction operation even when the distance between the follower and the box is extremely reduced, and with which any possibility of damage to the movable stem or the box is eliminated.

The method according to the invention is characterized in that one directs a liquid jet towards the exposed surface of the packing rings, the kinetic energy of the jet being low enough not to damage the device box or movable stem but still sufficiently high to locally disaggregate the exposed packing ring.

In this way, the internal mechanical stresses acting inside this packing ring, and resulting either from the treatment to which it has been submitted before being placed in the box, or from the pressure exercised later on by the follower, are eliminated or considerably reduced, so that the packing ring can then slide easily along the stem to be extracted.

In a preferred embodiment, the jet's kinetic energy is at least sufficient to bore a hole in all of the packing rings of the stuffing box, one at a time.

In this case the liquid jet passes through the exposed packing ring, and being pushed back by the next packing ring or by the bottom of the box everts a pressure on the exposed packing ring, this pressure being sufficient by itself to raise the latter along the stem until it pops out of the box. In order to complete the extraction operation, it is then sufficient to twist the ring using its radial slot and to pull it away from the stem of the device.

According to the invention, one advantageously uses for the jet a pressure of about 800 bars, which is sufficient to obtain, in at most a few minutes, the extraction of the most commonly used packing rings, without any danger of damage to the other parts of the device.

Also according to the invention, one preferably uses a coherent cylindrical jet with a diameter in order of 0.5 mm.

In this way the jet forming nozzle can have outside dimensions sufficiently small to enable its use even with hard to reach packing boxes and packing rings having a diameter equal to or even less than 10 mm, while retaining its efficiency with larger rings.

Furthermore, the choice of this jet enables the use of nozzle liquid supply means having a reduced volume and weight, for example a compressor having as its power source air under pressure, which enables them to be mounted on a movable carriage. It is thus easier to bring the apparatus near to the device from which the packing rings are to be removed.

In order to easily position the nozzle above the packing rings, the invention provides means for fastening the nozzle on the device itself; in particular, when the device is a valve, the invention contemplates the use of a removable swivelling fastener or clamp, for fastening the nozzle, via a supporting arm, onto the valve yoke which is used to carry the stem driving means.

To avoid projection of liquid jet droplets or packing chips into the space surrounding the device on which one is operating, the invention provides a protective hood surrounding the upper portion of the stuffing box and the movable stem, and formed for example of two half shells which fit together, the hood is provided with means for introducing the nozzle and means for removing the used liquid.

According to the invention one can use any number of liquids but preferably demineralized water. Demineralized water is preferred because it is readily available, has a sufficiently high density, and avoids calcium deposits which could clog the nozzle.

BRIEF DESCRIPTION OF THE DRAWINGS

The invention will be well understood in view of the description made below as an example only, with reference to the accompanying drawings, in which.

DETAILED DESCRIPTION OF THE INVENTION

The invention will now be more specifically described by reference to the attached drawings.

Figure 1:
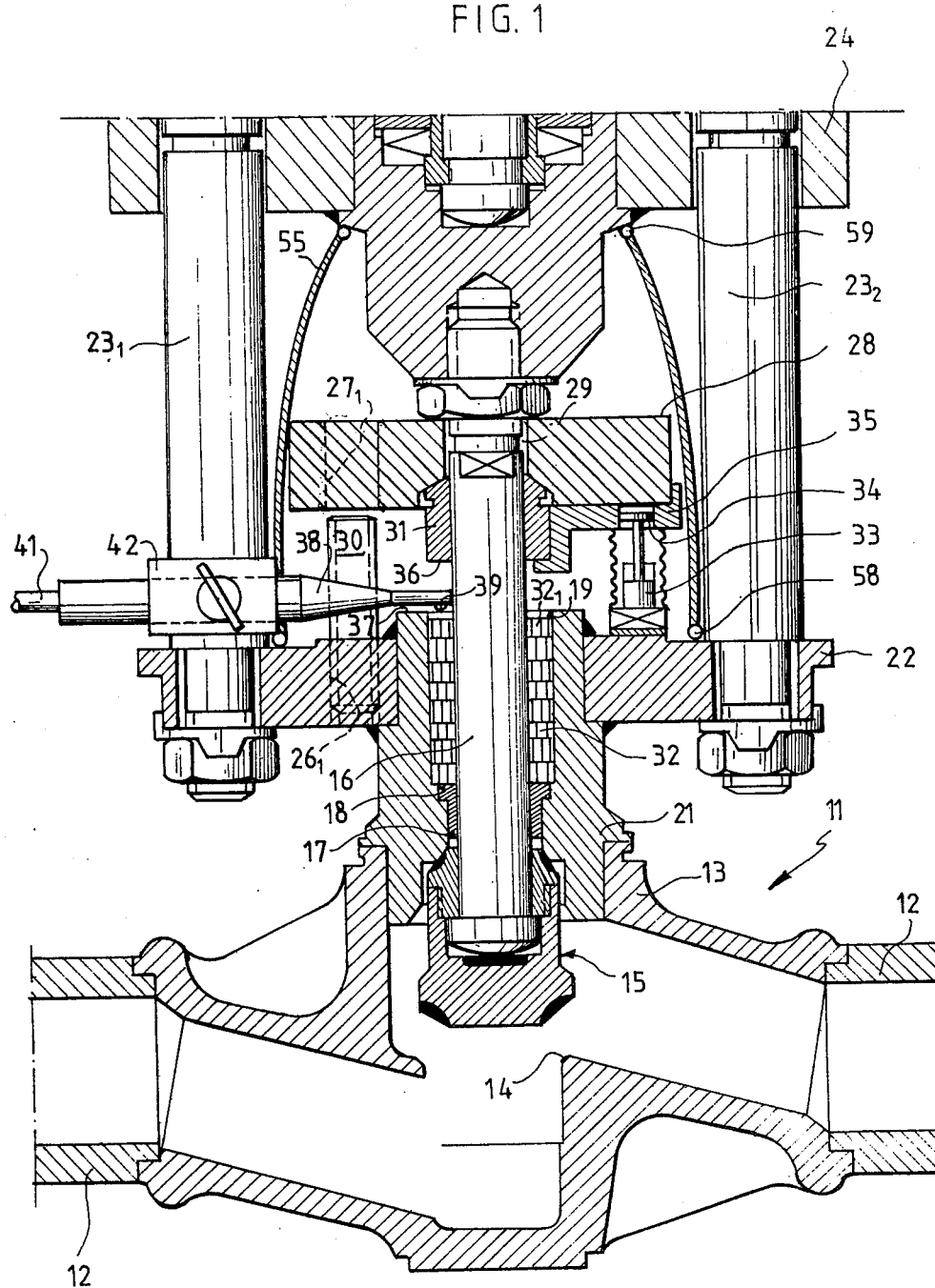
FIG. 1 is a cross-section of a valve lower portion at the beginning of an operation of extracting the packing rings.

FIG. 1 shows a valve 11 inserted in a pipe 12 and having a body 13 provided with an annular seat 14 which can receive a disc 15 carried by a stem 16 sliding in a ring 17 the upper surface 18 of which forms the bottom of a cylindrical chamber 19 coaxial with the stem and formed in a bonnet 21 welded on the upper (in the drawing) portion of body 13.

A plate 22, welded on the upper portion of the bonnet 21, carries four braces 23 or yoke arms, symmetrically disposed about the stem 16 and located two by two respectively in the plane of the figure and the axial plane which is normal to it, the braces supporting the driving means (not shown) of the stem 16. The braces $23_1$ and $23_2$, which are the only one represented in FIG. 1, receive a guiding bar 24 for guiding and driving stem 16 when it is being actuated by the driving means; the bar 16 can also be used as a means for indicating the position of disc 15.

Two holes 26 are threaded through plate 22, symmetrically with respect to stem 16 in a plane bisecting the planes referred to above in which the braces 23 are located two by two. The threaded holes 26 receive the lower ends of threaded pins 30, the other ends of which are engaged through holes 27 bored in a stuffing box flange 28 fitted by its central opening 28 around the stem 16 (only the holes $26_1$, $27_1$ and the pin $30_1$ being represented in FIG. 1).

The flange 28 receives at its lower portion a sleeve shaped follower or gland 31, surrounding stem 16, and having an external diameter slightly less than the internal diameter of chamber 19, in order to be able to penetrate into the latter to exert a pressure on the eight packing rings 32 which are lodged in the chamber 19 when the flange 28 is pulled nearer the plate 22 under the action of nuts screwed on the upper threaded portion of the pins 30.

To allow the extraction of the packing rings 32 without having to completely dismantle the driving means of the stem 16, the disc 15, as shown, is driven to its uppermost position, the said nuts are undone, the flange 28 and the follower 31 are raised along stem 16 until they abut on the lower surface of bar 24, in which position they are maintained by a jack 33 introduced between the flange 28 and the plate 22, the head 34 of which carries a height adjustable support piece 35 which matches the exact shape of the lower surfaces of the flange 28 and the follower 31.

Figure 3:
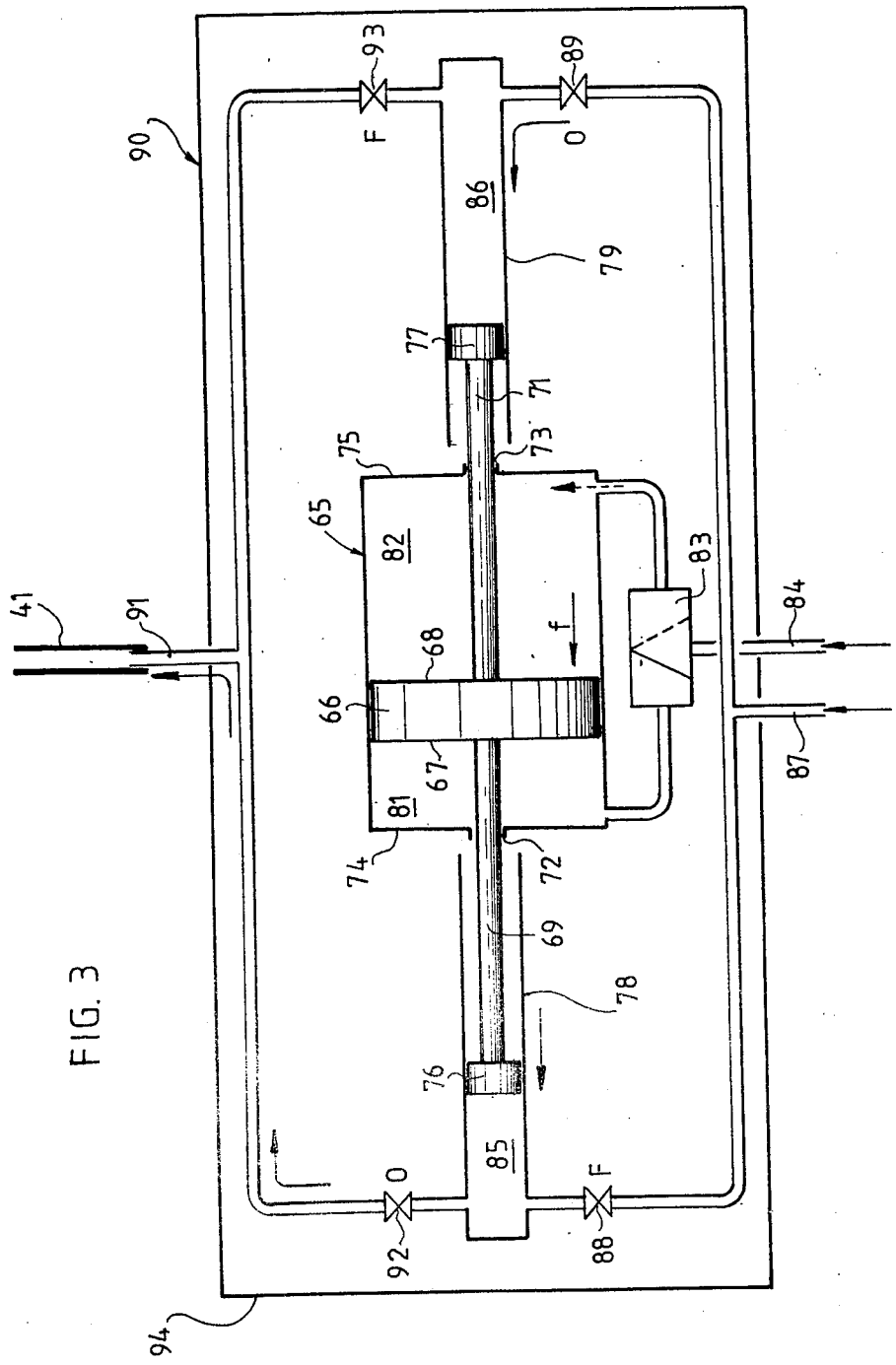
FIG. 3 is a sketch of a nozzle liquid supply means.

A water-projecting nozzle 39 carried by a supporting arm 38, is introduced between the annular lower surface 36 of the follower 31 and the annular upper surface 37 of the stuffing box, the nozzle having for example a tapering section, and communicating through a conduit formed in arm 38 with a flexible tube 41 connected to pressurized water supply means 90 (FIG. 3).

Figure 4:
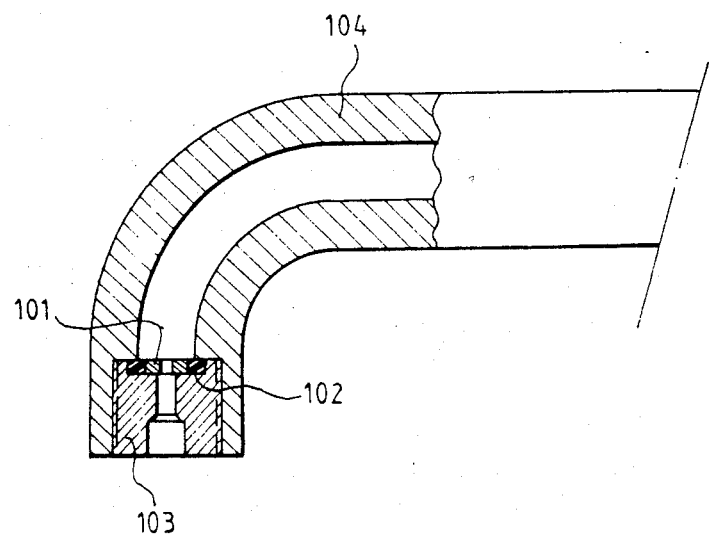
FIG. 4 is a cross-section of a nozzle.

The jet is ejected by an opening formed in a sapphire 101 (FIG. 4) included in a plastic material 102, made for example of "DELRIN", the diameter of the opening being equal to the diameter of the jet. The material 102 is then set in a metallic holding element 103 threaded and screwed on the nozzle holder 104.

Similar nozzles are described in U.S. Pat. Nos. 3,212,378, 3,088,854 or 2,985,050.

Figure 2:
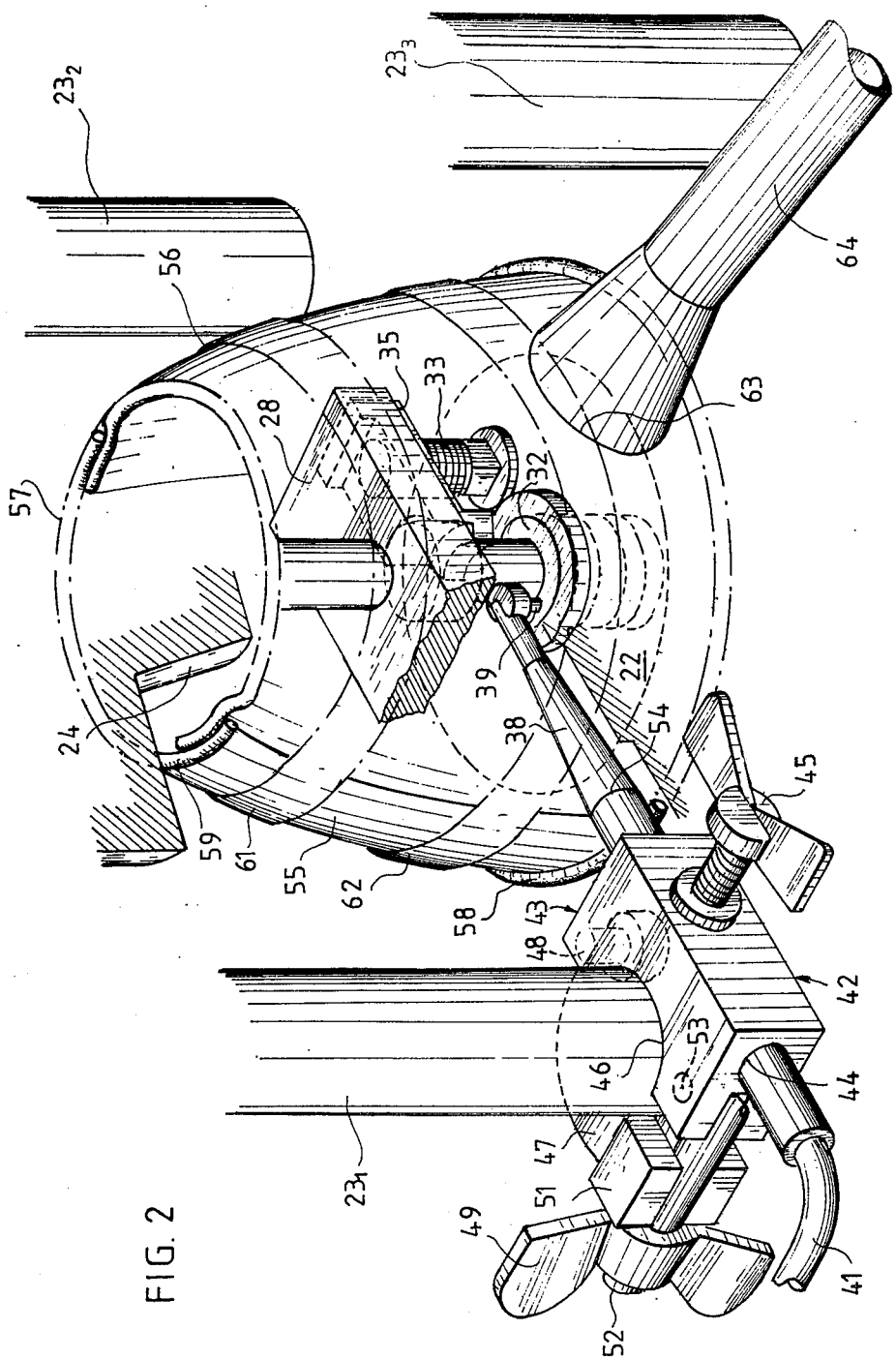
FIG. 2 is a perspective view similar to FIG. 1.

As seen most clearly in FIG. 2, a fastening means 42 is provided to position nozzle 39 above the packing rings 32, and it comprises a body 43 through which is bored a hole 44 receiving arm 38 which is blocked in position by a screw 45. The body 43 comprises a semi-cylindrical surface 46 matching the shape of brace $23_1$ on which arm 38 is to be fastened, and a hook 47 hinged at 48 on body 43 is applied on the other side of brace $23_1$ under the action of a thumb-screw 49 engaging in the forked end 51 of hook 47, said thumb-screw being screwed on a threaded pin 52 hinged at 53 on body 43.

The first end of arm 38 passes through a hole 54 into a protective hood 55 in the shape of a truncated cone or dome. The hood 55 is formed by joining together two half shells 56, 57 made of a relatively elastical material, such as plastic, which is also transparent in such a way that the whole extraction operation can be seen from outside the hood, the shells being fitted together for example by snapping or by "Velcro" type bands.

The lower edge of hood 55 rests by a water-tight pad 58 on the upper surface of plate 22, the upper edge resting with interposition of a water-tight pad 59 on bar 24. The hood 55 is provided with stiffening rings 61, 62, and a second lower opening 63 is fitted with a water evacuation tube 64 connected to a filter, a pump and disposal means (not shown) which collect the water projected by nozzle 39 and the chips of the packing rings extracted from box 21.

The nozzle's pressurized water supply means 90 comprises (FIG. 3) a main cylinder 65 in which slides a piston 66 having two opposite faces 67, 68 which are fitted with shafts 69, 71, engaged laterally in openings 72, 73 of the end faces 74, 75 of the cylinder, and supporting at their ends pistons 76, 77 having a surface area substantially smaller than that of piston 66, and sliding in cylinders 78, 79.

The chambers 81, 82 of cylinder 65 bounded by piston 66 and the faces 74, 75 respectively are connected by a pneumatic circuit with a switch-over device 83 to a pressurized air input 84, and chambers 85, 86 of cylinders 78, 79 are connected on the one hand to a low pressure water supply 87 through inlet check valves 88, 89, and on the other hand to liquid high pressure outlet piping 91 through check valves 92, 93, piping 91 being connected by the flexible tube 41 to nozzle 39.

The whole of the compressor is mounted on a wheeled movable carriage 94 and connected by flexible tubes to air and water supply means.

The apparatus which has been described above works in the following way:

One first raises the stem 16, the flange 28 and the follower 31 to their uppermost position shown on FIG. 1, and then one fixes these elements in this position with jack 33 and support 35. The nozzle 39 is next located above the packing rings 32, in such a way that its liquid jet can be directed approximately perpendicular to the upper exposed surface of the first packing ring $32_1$ and in order to reach it approximately at a median point of its width.

The thickness of the front end of arm 38 and of the nozzle 39, which is about 5 mm, is sufficiently reduced to allow the introduction of the nozzle into the space between surface 36 of the follower and the packing ring $32_1$.

The arm 38 is then fixed in this position by tightening the screws 45 and 49, and the hood is placed and maintained in position through the spring action resulting from the fact that the hood height when unconstrained is greater than the distance between plate 22 and bar 24.

Air under a pressure of about 10 bars is then introduced by the switch-over device 83 in one of the chambers 81, 82, for example in chamber 82 of cylinder 65, and as a result the piston 66 is moved from right to left (arrow f on FIG. 3), and the water brought in under a pressure of about 3 to 4 bars by supply 87 into chamber 85 of cylinder 78 is thus forced by piston 76 through the piping 91 under a pressure of about 800 bars.

Just before the piston 66 reaches the end 74 of cylinder 66 a control means well known in the art changes the position of switch 83, and chamber 81 now receives in its turn the air under pressure whereas chamber 82 is connected to the atmosphere. Piston 66 thus moves in the direction opposite to arrow f, which in the one hand brings chamber 86 under high pressure, this chamber now supplying outlet piping 91, as check valve 89 avoids all back-flow of the water towards supply 87, and which on the other hand fills chamber 85 with water through valve 88 and supply 87, valve 92 avoiding all high pressure water back-flow in chamber 89 through piping 91.

The high pressure water supplied to nozzle 39 through flexible tube 41 be formed by the nozzle into a coherent cylindrical jet having a diameter of about 0.5 mm, which is directed towards the upper surface of packing ring $32_1$ with a discharge rate of the order of 5 liters per minute.

After a few seconds of operation the pressurized jet has bored a hole through the packing ring. The diameter of this hole may reach 1 to 2 mm for example, even when the ring, generally made of graphite asbestos or of expanded graphite, has a width of 35 to 40 mm.

The pressurized water which introduces itself between the lower surface of packing ring $32_1$ and the upper surface of the following packing ring $32_2$ pushes the first ring out of chamber 19.

It has been found, surprisingly, that it is not necessary to move nozzle 39 around the packing rings 32 to another point to obtain the extraction. On the contrary, the boring of just a single hole in the rings eliminates or substantially reduces the internal mechanical stresses which are set up when the rings are jammed into place by the follower 31, and which are not released even when the follower is in the position shown in FIG. 1.

When the space available between the stuffing-box and the follower is less than about 10 mm, it is then necessary to stop the jet, to open the hood 55, and to twist the extracted packing ring out of the stem 16, by hand or with a tool, before admitting again water under high pressure to the nozzle.

The extraction operation can then be resumed, by successive steps, until the extraction of the last ring.

Nevertheless, when the space comprised between the stuffing-box and the follower is larger, several rings, or even all the rings can be extracted during a single step of nozzle operation.

The water injected by nozzle 39, having been used for extracting the packing rings, is then evacuated by the tubing 64.

In order to speed up the extraction operation, in particular when the nominal diameter of the valve is greater than about 100 mm, it is also possible to use simultaneously two nozzles or more, spaced along the upper surface of the packing rings.

The liquid used for the jet is normally demineralized water, to avoid calcium deposit on the nozzle neck, which might impair its operation. But it is also possible to use a number of other liquids, for example a solvent, if one wishes to clean the chamber 19 simultaneously with the extraction.

In the same way the numerical values given above are given only by way of an example, and can be modified to fit the stuffing-box on which one is operating, and the method according to the invention is of course not limited to the example just described, and can be applied to any stuffing-box used in combination with another device, for example with a pump or compressor.

Also the jet pressure can be lowered or instead raised by several hundreds bars, and the diameter of the nozzle can also be increased or decreased without departing from the scope of the invention.

What is claimed is:

1. A method for extracting at least one packing ring disposed within a stuffing-box, the stuffing-box having a top and a bottom, with a removable seal disposed over the top, comprising the steps of:
   (a) removing the seal from the top of the stuffing-box to gain access to an exposed packing ring;
   (b) boring a hole through the exposed packing ring by directing a liquid jet toward the packing ring, the liquid jet having a kinetic energy low enough not to damage the stuffing-box but still sufficiently high to bore the hole in the exposed packing ring, whereby the internal mechanical stresses acting inside the exposed packing ring are substantially reduced so that the exposed packing ring is loosened with respect to the stuffing-box; and
   (c) removing the loosened packing ring from the stuffing box.

2. The method of claim 1 wherein there are at least two packing rings stacked one atop the other, and further comprising the step of repeating steps (b) and (c) until all packing rings have been removed from the stuffing-box.

3. The method of claim 2, wherein the kinetic energy of the jet is at least sufficient to successively bore a hole in each of the packing rings of the stuffing-box.

4. The method of claim 3, wherein step (c) comprises the step of directing the jet through the hole bored in the exposed packing ring into contact with an adjoining packing ring, or into contact with the bottom of the box if only one packing ring remains, wherein the liquid of the jet is forced because the bored packing ring and the adjoining packing ring, or the bottom of the box if only one packing ring remains, whereby the bored packing ring is lifted out of the stuffing-box by the pressure of the jet.

5. The method of claim 4, wherein in step (b) the jet is directed at the exposed packing ring at a point approximately midway along its width.

6. The method of claim 1, wherein the liquid used is demineralized water.

7. The method of claim 1, wherein the liquid of the jet is formed having a pressure of about 800 bars.

8. The method of claim 1, wherein the liquid jet is formed having a diameter of approximately 0.5 mm and is coherent and cylindrical.

* * * * *